June 21, 1966     M. B. VORDAHL     3,256,599
METHOD OF MAKING MAGNESIUM-BONDED LAMINATED ARTICLES
Filed June 5, 1961
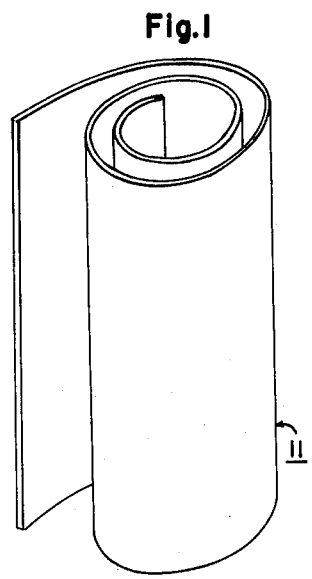
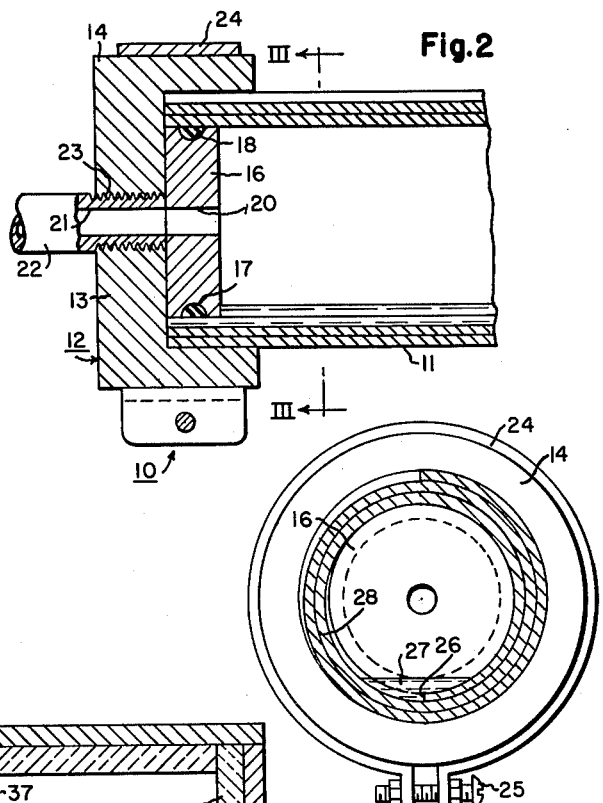
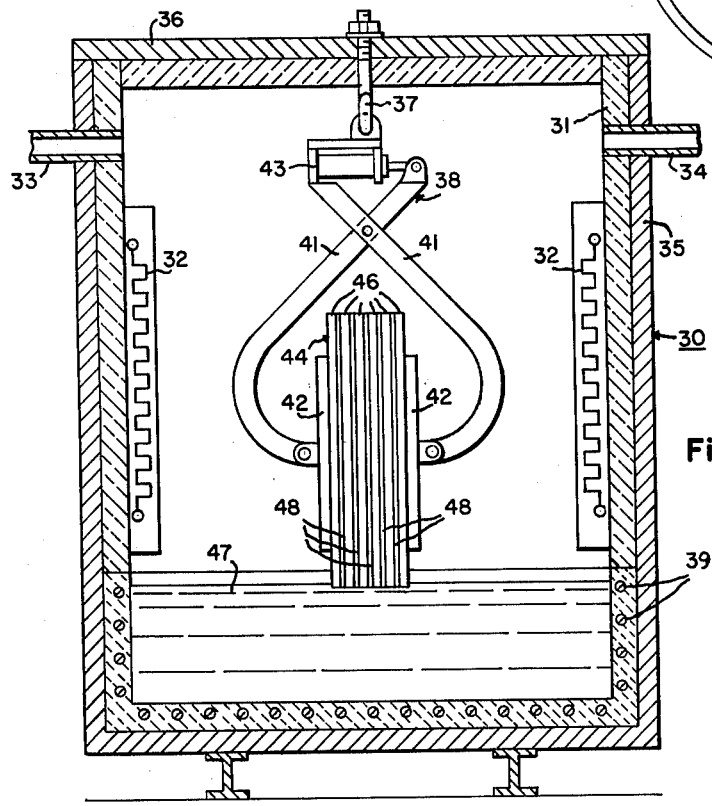
INVENTOR
Milton B. Vordahl
BY
*John R. Pegan*
ATTORNEY 3,256,599
METHOD OF MAKING MAGNESIUM-BONDED
LAMINATED ARTICLES
Milton B. Vordahl, Beaver, Pa., assignor to Crucible Steel Company of America, Pittsburgh, Pa., a corporation of New Jersey
Filed June 5, 1961, Ser. No. 114,904
2 Claims. (Cl. 29—500)

This invention pertains to methods of making laminated and lap-jointed articles, and more particularly, to articles of titanium and alloys thereof comprising relatively large juxtaposed areas to be joined together.

Titanium and titanium alloys have become, in recent years, of increasing importance as constructional materials, for example, in the fabrication of corrosion resistant structures such as chemical reaction vessels, piping, tubing etc., as well as in the construction of articles and structures requiring a relatively high strength to density ratio as aircraft skins, missile cases and the like. In the latter and allied applications, increased strength is sometimes sought and achieved by forming the desired structure as a laminate comprising a plurality of juxtaposed layers bonded to one another, or, alternatively, in the form of a wrapped ribbon construction, especially in the case of cylindrical structures, as missile cases. The laminated and ribbon wrapped structures offer the additional advantage of relative ease of manufacture, especially in the case of cylindrical structures of large diameter and in the case of flat or curved structures of relatively large surface area. This is true because of the difficulties encountered in the construction of such articles from relatively thick, integral sheets or plates of difficulty workable materials as titanium and its alloys. Moreover, in the case of articles such as skins for aircraft construction, missile cases, etc., allowable dimensional tolerances are generally quite small and use of laminated or wrapped construction, as over a close-tolerance mandrel or form, permits adherence to closer tolerances.

The aforesaid prior art laminated and ribbon constructions of titanium and its alloys are not, however, free of constructional difficulty. For example, considerable trouble has been encountered in the construction of such articles by reason of the difficulty in obtaining complete and uniform bonding between adjacent layers of the sheet, strip or ribbon utilized. Such sheet, strip or ribbon is, in accordance with the prior art, bonded by more or less usual brazing procedures, i.e., the material, in its finished form, is coated, as by dipping, spraying, interleaving, vapor deposition, etc., with a suitable brazing alloy of known type. Next, the coated material is disposed in its final desired position, e.g., stacked in juxtaposed layers in the case of laminated sheet or strip or wrapped, in overlapping helical or criss-cross fashion over a suitable mandrel, in the case of ribbon wrapped structures. Complete and uniform bonding of the adjacent layers of the coated metal requires accurate positioning of the several layers, as, for example, by the use of relatively elaborate holding fixtures in the case of flat or curved articles. The thus formed composite articles are then heated above the melting point of the brazing alloy which thereupon flows between the juxtaposed layers to form a bond therebetween.

The production of all of the aforesaid prior art structures involves, of course, a relatively large number of separate operations or steps, thereby increasing expenditures of time and money and, consequently, increasing the cost of the completed articles.

It is another object of the invention to provide a simplified method for the ready production of laminated and similar articles of titanium and titanium alloys.

In accordance with the foregoing objects, a preferred embodiment of an article pursuant to this invention comprises a plurality of juxtaposed layers of titanium or a titanium alloy wherein the layers are bonded one to another with magnesium.

A preferred embodiment of the inventive method comprises forming a laminated article of titanium or a titanium alloy, contacting at least a portion of each joint of the laminated article with molten magnesium while maintaining the article at a temperature above the melting point of the magnesium, whereby the magnesium flows throughout each such joint and between all adjoining surfaces to be bonded together, and thereafter cooling the article to solidify the magnesium and to produce an integral, laminated article.

The foregoing and other objects of the invention will be more fully appreciated by an inspection of the following description and the accompanying drawings wherein:

FIG. 1 is an isometric view of a partially formed concentrically wrapped structure prior to bonding of adjacent surfaces in accordance with the invention;

FIG. 2 is a view, partially in cross section, of a portion of the tubular wrapped structure of FIG. 1 in a suitable fixture for holding the tube during bonding of juxtaposed surfaces thereof in accordance with the method of the invention;

FIG. 3 is a cross sectional view of the laminated tubular structure shown in FIGS. 1 and 2 and taken along line 3—3 of FIG. 2, and FIG. 4 is an elevational view, partially in cross section, of a suitable device for effective bonding between adjacent flat sheets to form a composite laminated article in accordance with the invention.

Referring now to the drawings, and more particularly to FIG. 1, the numeral 11 designates generally a flat sheet of titanium or a titanium alloy in a preliminary step of manufacture into a laminated cylindrical pipe or tube, in accordance with the invention. The flat sheet 11 is rolled or otherwise reduced to a suitable thin gage form, sheared to a predetermined length dependent upon the desired number of laminations and the diameter of the finished article, and then wrapped, in successively overlying concentric layers as, for example, upon a suitable mandrel of a size commensurate to the desired internal diameter of the finished article.

Referring now to FIGS. 2 and 3, the tubular article of FIG. 1, upon completion of the wrapping operation, whereupon the successive layers are brought into face to face relationship with each other, is positioned on a suitable fixture, designated generally by the numeral 10, as illustrated in FIG. 2. As shown in that figure, the fixture 10 comprises a pair of flanged caps, designated generally by the numeral 12, for reception of the extremities of the tubular article 11. Each of the caps 12 is provided with an end portion 13 and a flange 14, the latter being adapted to receive and circumferentially abut an end portion of the tubular article 11. Supporting discs 16 are positioned internally of the tubular article adjacent to the extremities thereof and adapted to abut and support the internal surface of the extremities of the tubular article 11. The disc 16 is provided with a peripherally extending groove 17 for reception therein of a resilient sealing ring 18 adapted to bear upon the inner wall of the tubular article 11 and to hermetically seal the same. The disc 16 is provided with a centrally disposed aperture 20 which is alignable and coextensive with a bore 21 of a plug 22 insertable within a aperture 23 disposed centrally of the end portion 13 of the cap 12. A pressure ring 24 is provided to extend about the periphery of each of the slightly resilient flanges 14 whereby tightening of the ring 24, as by means of threaded rod 25, results in the extremity of the tubular article 11 being tightly gripped and thereby sealed between the flange 14 and the supporting disc 16.

It has now been found that titanium and alloys thereof are wettable to an extremely high degree by molten magnesium and, further, that, when a joint formed by abutting areas of titanium or a titanium alloy is contacted with molten magnesium, the latter metal is rapidly drawn into the joint and thoroughly and completely covers the abutting metal surfaces. I have found that, in order to effect introduction of molten magnesium into joints between adjoining surfaces of titanium or titanium alloy, it is necessary only that the surfaces to be joined be thoroughly cleaned and maintained, during the process of introducing magnesium, at a temperature above the melting point of the magnesium, i.e. above about 651° C. This is, of course, far below the melting point of titanium (1800° C.) or its various alloys and is also far below the temperature at which titanium or its alloys would undergo damage from overheating. No special spacing means is required between adjacent surfaces to be so bonded. The magnesium has been found to have the ability to flow between even tightly pressed layers merely by reason of the extremely small spacing inherently present because of unavoidable surface discontinuities, even in the case of highly polished surfaces. In order to accomplish the magnesium bonding contemplated by the invention, it is necessary only to contact a portion of each joint to be joined together, the magnesium readily flowing, by capillary action and in defiance of gravity, throughout the entirety of the joint.

In performing the inventive method for the construction of a tubular article as illustrated in FIGS. 1 and 2 in conjunction with a fixture 10 as illustrated in FIG. 2, a small piece of solid magnesium is placed within the tubular article prior to assembly of the article within the fixtures. The interior of the tube 11 is then thoroughly flushed with an inert gas, such as argon, introduced through one of the plugs 22 and corresponding aperture 19 in a disc 16. The flushing gas is removed through the other of the fixtures. After flushing, the fluid supply and exit lines are sealed and the assembled device is then heated in a muffle furnace (not shown) (also containing a suitable inert atmosphere) to above the melting point of magnesium. As illustrated in FIGS. 2 and 3, the assembly is so positioned that an internal seam 26 is located at the bottom of the tube 11. Consequently, when the magnesium melts it forms a pool 27 of molten metal overlying the seam 26 whereby molten magnesium is drawn, by capillary action, into joint 28 adjacent the seam 26 and thence through the spiral joint of the tube 11. Thereafter, the assembly is removed from the muffle furnace and cooled to room temperature, whereby the magnesium solidifies in the spiral joint to form an integral, bonded tube.

As an example of the production of a tubular article as illustrated in FIGS. 1–3, a cylinder was made comprising four concentric turns of titanium alloy foil having a width of four inches and a thickness of 0.003 inch. The foil comprised an alloy of 13% vanadium, 11% chromium, 3% aluminum and balance titanium. The foil was wrapped over a mandrel to a one inch outside diameter. The thereby produced tube was then removed from the mandrel. A piece of solid magnesium weighing 10 grams was inserted in the tube and the ends of the tube were capped, as illustrated in FIG. 2. The interior of the tube was then purged with argon gas and placed in a muffle furnace also purged with argon. The assembly was then heated to a temperature of about 1500° F. and held at that temperature for 15 minutes. A small portion, e.g., about 1 gram, of the magnesium, upon melting, was drawn into the spiral joint of the tube, covering all abutting surfaces. The assembly was then removed from the furnace and cooled to solidify the magnesium.

The tube, while in the same assembly, was then pressurized hydraulically without prior aging of the titanium alloy. Pressurization was continued until the tube ruptured at an apparent skin stress of 180,000 p.s.i. The ruptured tube showed good ductility, i.e., there was no indication of shear rupture along the joint lines, the rupture being typically biaxial tensile failure.

The products of the invention are not limited to the construction illustrated in FIGS. 1–3 but, as aforesaid, may take a variety of forms. Preferred product forms, however, are limited to those wherein the abutting surfaces of titanium or titanium alloy or relatively large. The joint formed by the magnesium bonding medium has a relatively low strength per unit area and, consequently, relatively large joint areas are required to utilize to the fullest extent the beneficial aspects of the invention. Typical useful joints comprise those inherent in concentrically wrapped articles as illustrated in FIGS. 1–3 and also articles having lap joints of relatively large abutting areas, bayonet- and slip-type joints, as well as laminated products formed of juxtaposed flat or curved sheets of relatively large areas.

FIG. 4 is illustrative of a further means for producing articles of laminated sheet construction. In FIG. 4, the numeral 30 designates generally a furnace comprising a refractory wall 31 and an outer jacket 35. The furnace is provided interiorly thereof with suitable heating means such as electrical coils 32 and 39. Entry and exit conduits 33 and 34, respectively, are provided for the introduction and removal of a suitable inert gas to flush the interior of the furnace 30 and thereby to remove all traces of oxygen. Oxygen removal is necessary in the performance of the inventive method since oxygen is extremely detrimental to titanium at the elevated temperatures required for bonding in accordance with the invention.

The furnace 30 is provided with a removable top portion 36 having means, such as hook 37, depending from the under surface thereof and adapted to suspend a supporting frame designated generally by the numeral 38. The frame 38 is provided with pivotally adjustable arms 41 and clamps 42 adapted to receive and to support therebetween an article assembly designated generally by the numeral 44 and comprising a plurality of juxtaposed individual sheets 46 of titanium or an alloy thereof. Supporting pressure is applied to clamps 42 by any suitable means, as fluid pressure cylinder 43 affixed to the extremities of arms 41. A pool 47 of molten magnesium is provided in the bottom of the furnace and the article assembly 44 is adjusted so that a lower extremity thereof contacts the pool of magnesium.

Upon heating of the assembly 44, magnesium is drawn from the pool 47 upwardly into joints 48 between the sheets 46. Upon cooling, the magnesium solidifies to form an integral bonded article.

In addition to the increased ease and economy of manufacture of laminated articles conferred by the method of the invention, and in addition to the enhanced joint uniformity of the products of the invention, the invention possesses further distinct advantages. Thus, as aforesaid, titanium, and especially some of the alloys thereof such as the all-beta titanium alloys, are susceptible to gross deterioration when exposed to oxygen at high temperatures. For example, the beta titanium alloy comprising 13% chromium, 11% vanadium, 3% aluminum, balance titanium, is capable of acquiring extremely high strengths when aged at elevated temperatures. However, if such aging is done in air, the resulting skin or case produced by penetration of oxygen into the alloy is highly damaging to ductility of the alloy. The detrimental effects of such oxygen-containing skin or case is not limited to the depth to which oxygen diffusion extends, but are manifested in other ways as well, such as decreased strength throughout the metal mass due to preferential alpha phase separation on planes normal to the metal surface caused by compressive stress exerted on the metal by the expanded, high oxygen skin. Magnesium has the attribute of preventing these undesirable results since it does not dissolve oxygen and hence does not transfer the same to the underlying titanium surface nor does magnesium react with the titanium to form a brittle layer, as do many other metals, which layer, although thin, is important in considering constructional applications utilizing thin sheet and foil.

Thus, not only does the invention provide, by the use of magnesium-bonded titanium and titanium alloy compositions, articles of ready and economical manufacture, but it provides vital protection against oxidation and other contamination of the joint and adjacent metal surfaces.

The maximum temperature of structural usefulness of the magnesium-brazed articles of the invention is limited to less than about 600–650° C. (the melting point of magnesium) and is preferably limited to below about 300–400° C. However, these maximum temperature limitations are adequate for many applications, including missile case construction.

It is to be understood that the foregoing description and drawings are only illustrative of the principles of the invention and that various modifications and additions may be made thereto by those skilled in the art without departing from the spirit and scope of the invention.

What is claimed is:

1. A method of making laminated articles comprising a plurality of layers of a material selected from the group consisting of titanium and alloys consisting predominantly thereof, comprising positioning the layers in face-to-face relationship with each other to form an assembly, heating the assembly to a temperature in excess of the melting point of magnesium, contacting at least a portion of an edge joint between each pair of layers with molten magnesium whereby the magnesium is drawn, by capillary action, between the layers, and cooling the assembly to solidify the magnesium and to effect a bond between the layers.

2. A method of making a lap-jointed, multipart article comprising a material selected from the group consisting of titanium and alloys consisting predominantly thereof, comprising positioning parts of said article in a desired finished-article relationship to form an assembly, heating the assembly, in the substantial absence of air, to a temperature within the liquidus range of magnesium, contacting at least a portion of each separate joint of said assembly with molten magnesium, whereby magnesium is drawn, by capillary action, throughout the joint, and cooling the assembly to solidify the magnesium, thereby forming bonds between the joints.

References Cited by the Examiner

UNITED STATES PATENTS

| | | | |
|---|---|---|---|
| 2,033,122 | 3/1936 | Cornell | 29—503 |
| 2,315,294 | 3/1943 | Stewart | 29—503 |
| 2,746,134 | 5/1956 | Drummond | 29—198 |
| 2,822,269 | 2/1958 | Long | 29—194 |
| 2,834,098 | 5/1958 | Pease et al. | 29—194 |
| 2,834,102 | 5/1958 | Pflumm et al. | 29—497 |
| 2,860,409 | 11/1958 | Boessenkool et al. | 29—497 |
| 2,914,848 | 12/1959 | Blum | 29—198 |
| 2,973,571 | 3/1961 | Meyering | 29—194 |

HYLAND BIZOT, *Primary Examiner.*

DAVID L. RECK, *Examiner.*

J. C. HOLMAN, *Assistant Examiner.*